(No Model.)

W. O. ALEXANDER.
CORN STALK CHOPPER.

No. 321,566. Patented July 7, 1885.

Witnesses.
A. Ruppert,
R. E. Grant

Inventor.
Wm. O. Alexander.
Per
Thomas P. Simpson.
Atty

UNITED STATES PATENT OFFICE.

WILLIAM OLIVER ALEXANDER, OF RICHLAND, MISSOURI.

CORNSTALK-CHOPPER.

SPECIFICATION forming part of Letters Patent No. 321,566, dated July 7, 1885.

Application filed March 5, 1885. (No model.)

*To all whom it may concern:*

Be it known that I, WILLIAM O. ALEXANDER, of Richland, in the county of Pulaski and State of Missouri, have invented an Improved Corn stalk-Chopper, of which the following is a specification.

The special object of the invention is to chop stalks by horse and machine power, instead of doing it by hand, and thereby enable a farmer to accomplish as much by one laborer as can be ordinarily by many who cut by hand, (leaving the stalks on the ground, which every farmer desires.)

Figure 1:
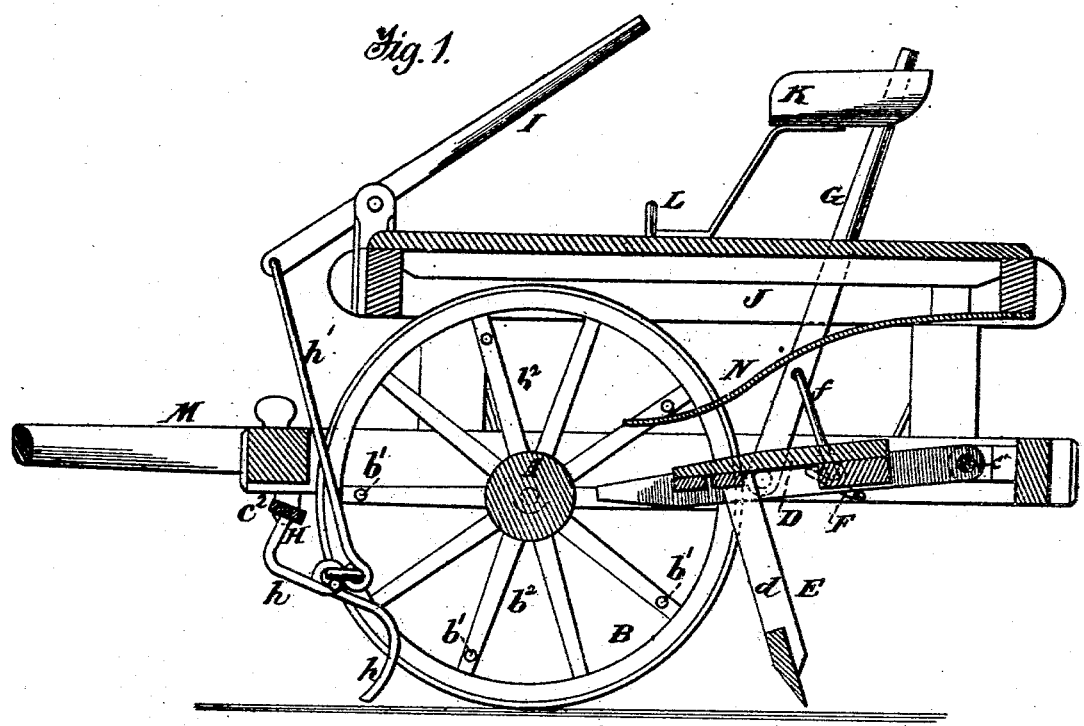
Figure 2:
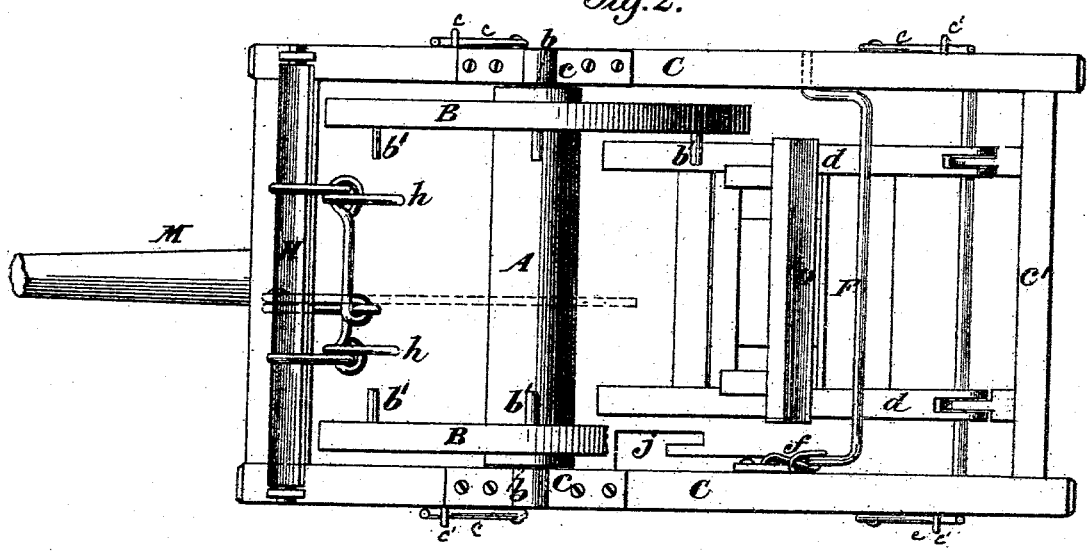

Figure 1 of the drawings represents a longitudinal sectional elevation. Fig. 2 is a bottom plan showing the position of the lifters with respect to the chopper.

In the drawings, A represents an axle carrying the fast wheels, B B, whose hubs are made integral with the axles and carry the journals $b$ $b$.

C is an oblong frame provided with the subjacent bearings $c$ $c$, in which turn said journals $b$, the light frame being thus supported upon the journals.

Upon the rear cross-bar, $c'$, is hinged a frame, D, at whose front end is made fast the downwardly-projecting chopper E, which, being moved down in the arc of a circle, operates upon the stalks with a slanting or shear cut. Its standards $d$ $d$ are made adjustable, in any preferred manner, on the frame D, so as to take up wear or regulate the downward stroke of the chopper.

F is a pivoted bail, which serves as a stop to prevent the chopper from descending too far, and also, in connection with a hand-lever, G, to hold up the chopper in turning at the ends of the rows or in going from place to place. The lever G is pivoted at its lower end to the frame C, and is connected with the bail F by a link, $f$.

Under the front end of frame C are placed the hanger-bearings $c^2$ $c^2$, in which is journaled a shaft, H, carrying the rearwardly-bent and forwardly-curved hooks or lifters $h$ $h$. Where the stalks have been bent by a storm, wind, rain, or other cause in a lateral direction across the rows, the lifters catch them up and turn them in alignment with the row, so that they will be brought at right angles to the chopper. They are connected by a link-rod, $h'$, with a hand-lever, I.

J represents a superposed frame detachably connected by hooks $c$ and eyes $c$ with the frame C, so that said frame J may be readily connected and disconnected with the mechanism below it, so that said mechanism may be properly adjusted, inserted, or removed. On the upper side of frame J is located the driver's seat K, and at the front of it a hook, L, by which the lever I may be fastened, so as to hold up the lifters $h$ at the turnings and in transporting the chopper from place to place. The lever G passes up through a slot, $j$, in the upper frame, and is held fast in a hook or notch, $j'$, so as to keep the chopper elevated as long as may be desired. A pole, M, or shafts may be secured in any suitable way to the front cross-bar of frame C.

The operation is as follows: The wheels may be made to straddle one or two rows, and as the vehicle is drawn along the side studs, $b'$, arranged on the wheel-spokes $b^2$, raise the chopper successively against the spring N, affixed to the bottom of frame J. Then, letting it go, the spring throws the chopper down with sufficient force to cut the stalks off near the ground. The spoke-studs may be so arranged and at such intervals as to cut the stalks at whatever distance apart they may stand. The spring which throws down the chopper may be, as shown, a long plate-spring; or it may be of any desired form or kind; or I may simply weight frame D.

Having thus described my invention, what I claim as new, and desire to protect by Letters Patent, is—

In stalk-choppers, the combination of an upper frame, J, carrying a subjacent spring, N, a lower frame, C, carrying a transversely rear pivoted hoe-frame, D, and two front ground-wheels provided with corresponding lateral studs adapted to simultaneously lift front projections on frame D, whereby frame D is raised against the actuating-spring N, for the purpose specified.

WILLIAM OLIVER ALEXANDER.

Witnesses:
JAMES S. ALEXANDER,
WILLIAM D. CRUMLEY.